(12) United States Patent
Hoeve et al.

(10) Patent No.: US 7,779,950 B2
(45) Date of Patent: Aug. 24, 2010

(54) INTEGRATED FRAME AND AIR BOX METHOD AND APPARATUS

(75) Inventors: Jason W. B. Hoeve, Stacy, MN (US); Michael John Bluhm, Osceola, WI (US)

(73) Assignee: Polaris Industries Inc., Medina, MN (US)

(*) Notice: Subject to any disclaimer, the term of this patent is extended or adjusted under 35 U.S.C. 154(b) by 862 days.

(21) Appl. No.: 11/120,092

(22) Filed: May 2, 2005

(65) Prior Publication Data

US 2008/0190683 A1    Aug. 14, 2008

(51) Int. Cl.
*B62D 61/02* (2006.01)
*B62K 11/00* (2006.01)
*B60K 13/02* (2006.01)

(52) U.S. Cl. ............... 180/219; 180/68.3; 180/229; 123/41.7

(58) Field of Classification Search ......... 180/219, 180/229, 68.1, 68.3, 225; 123/41.7, 41.58, 123/41.62
See application file for complete search history.

(56) References Cited

U.S. PATENT DOCUMENTS

| | | | | |
|---|---|---|---|---|
| 4,321,978 A * | 3/1982 | Tominaga et al. | ........... | 180/225 |
| 4,327,930 A | 5/1982 | Tominaga et al. | | |
| RE31,994 E | 10/1985 | Tominaga et al. | ........... | 180/225 |
| 4,597,466 A | 7/1986 | Yamada | ........... | 180/225 |
| 4,830,135 A * | 5/1989 | Yamashita | ........... | 180/229 |
| 5,012,883 A | 5/1991 | Hiramatsu | ........... | 180/225 |
| 5,301,767 A | 4/1994 | Shiohara | ........... | 180/219 |
| 5,375,677 A * | 12/1994 | Yamagiwa et al. | ........... | 180/219 |
| 5,577,570 A | 11/1996 | Shiohara et al. | ........... | 180/219 |
| 5,860,405 A | 1/1999 | Muramatsu et al. | | |
| 6,105,701 A * | 8/2000 | Buell | ........... | 180/229 |
| 6,142,123 A * | 11/2000 | Galasso et al. | ........... | 123/486 |
| 6,422,332 B1 * | 7/2002 | Takata et al. | ........... | 180/68.3 |
| 6,619,415 B1 * | 9/2003 | Hasumi et al. | ........... | 180/68.1 |
| 6,695,088 B2 * | 2/2004 | Schroeder | ........... | 180/229 |
| 6,971,462 B2 * | 12/2005 | Ito et al. | ........... | 180/68.1 |
| 7,077,230 B2 * | 7/2006 | Arnold | ........... | 180/229 |

(Continued)

FOREIGN PATENT DOCUMENTS

EP    1 515 037 A1    3/2005

(Continued)

OTHER PUBLICATIONS

International Search Report dated Aug. 29, 2006, International Application No. PCT/US2006/017243.

(Continued)

*Primary Examiner*—Lesley Morris
*Assistant Examiner*—Marc A Scharich
(74) *Attorney, Agent, or Firm*—Baker & Daniels LLP

(57) ABSTRACT

The present teachings generally include a motorcycle having an engine with at least two cylinders. A first cylinder head has a first top portion and a first side portion. A second cylinder head has a second top portion and a second side portion. The first cylinder head and the second cylinder head are associated with the engine. A frame member defines an integral air box that communicates air into the engine. The frame member couples to the first side portion of the first cylinder head and the second side portion of the second cylinder head.

26 Claims, 16 Drawing Sheets

U.S. PATENT DOCUMENTS

| | | | |
|---|---|---|---|
| 7,264,072 B2 * | 9/2007 | Yoshikawa et al. | 180/68.3 |
| 7,380,624 B2 * | 6/2008 | Momosaki | 180/68.3 |
| 2005/0247287 A1 * | 11/2005 | Kondo et al. | 123/337 |

FOREIGN PATENT DOCUMENTS

| | | |
|---|---|---|
| JP | 2004352144 | 12/2004 |

OTHER PUBLICATIONS

Flori, Massimiliano, European Patent Office, Office Action for related application No. EP 06759085.8-2425, May 8, 2009, 4 pages.

* cited by examiner

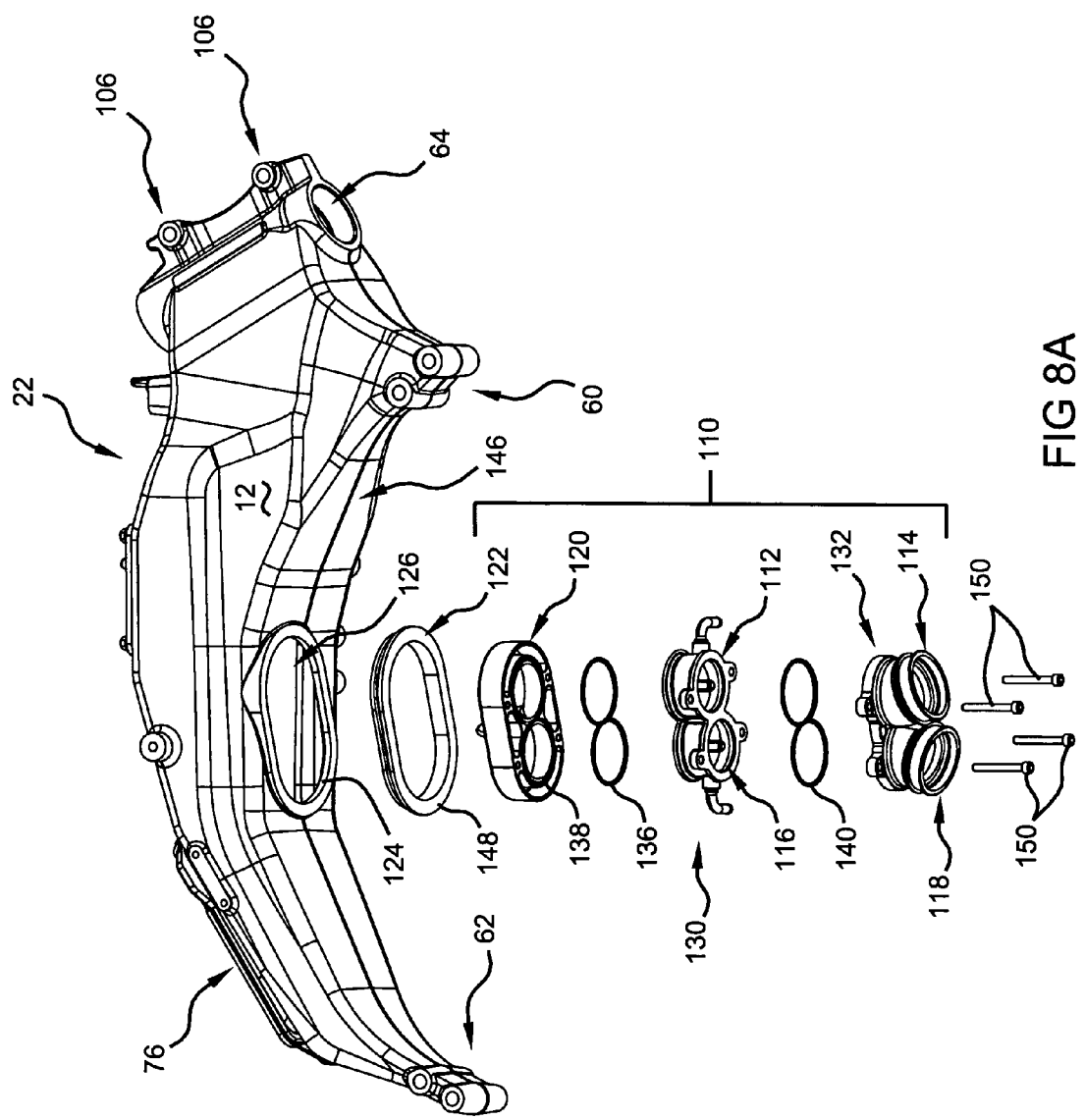

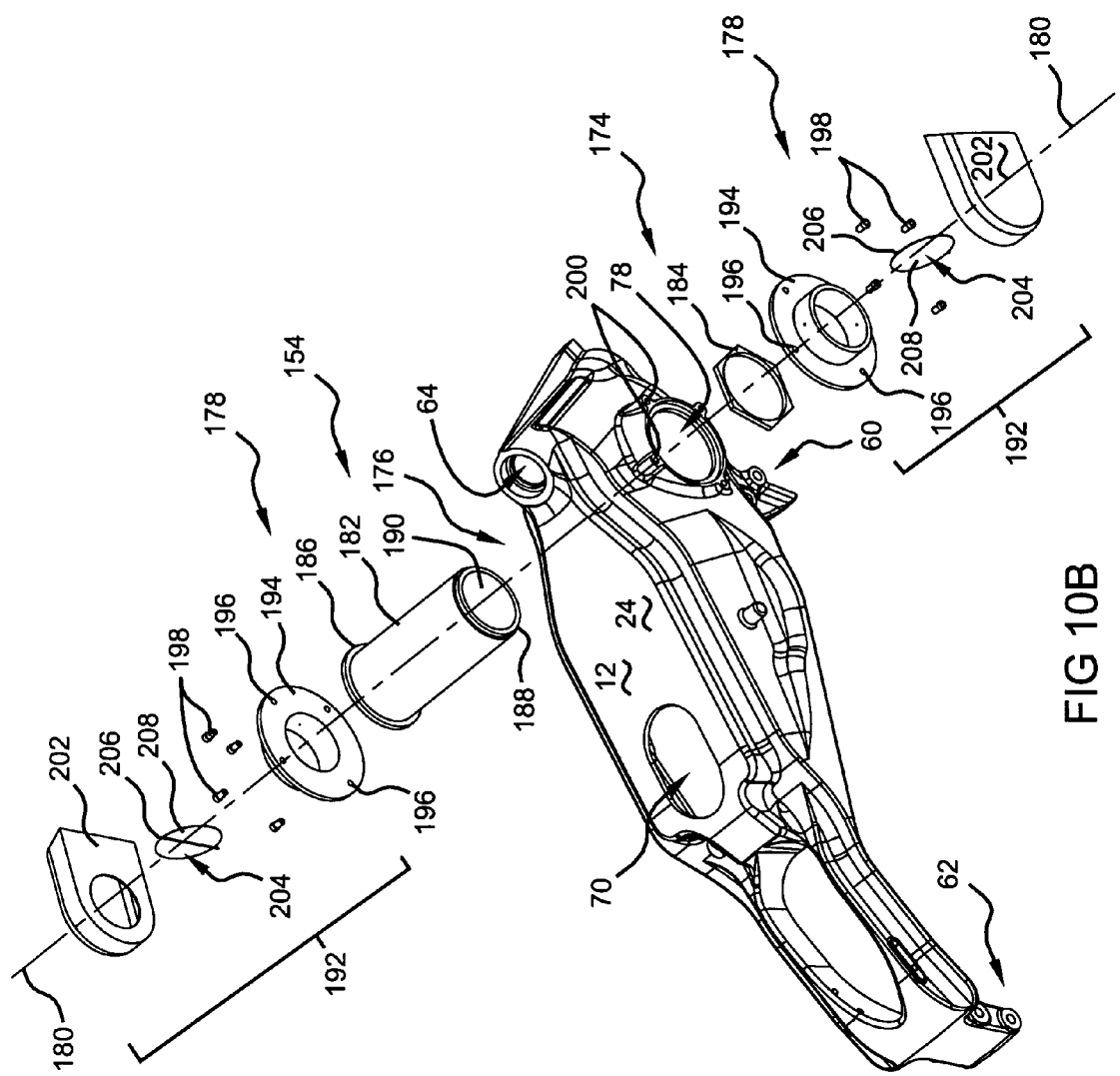

US 7,779,950 B2

INTEGRATED FRAME AND AIR BOX METHOD AND APPARATUS

FIELD

The present teachings relate to a motorcycle and more particularly relate to an integrated frame and air box for the motorcycle.

BACKGROUND

Typically, a motorcycle utilizes a tubular frame that cradles an engine and attaches to a front and a rear suspension. The tubes of the tubular frame may be forged and then welded or fastened together. Depending on the tubular frame structure, the frame may be relatively less rigid thus increasing the propensity of the frame to flex. Increased flexing of the frame may enhance vibration and noise. Moreover, welding and mechanical fastening of the tubular frame members may increase point-to-point dimensional tolerances.

Typically, a plastic and independent air box couples to the engine. The air box filters and directs air into the intake of the engine and is positioned between the tubular frame and the engine. It will be appreciated that one way to increase the structural rigidity of the tubular frame is to enlarge the frame by, for example, increasing the diameter of the tubing. It will also be appreciated that one way to increase airflow through the air box is to increase the volume of the air box. With the above in mind, both the tubular frame and the air box compete for an allocation of space and gross weight on the motorcycle.

SUMMARY

The present teachings generally include a motorcycle having an engine with at least two cylinders. A first cylinder head has a first top portion and a first side portion. A second cylinder head has a second top portion and a second side portion. The first cylinder head and the second cylinder head are associated with the engine. A frame member defines an integral air box that communicates air into the engine. The frame member couples to the first side portion of the first cylinder head and the second side portion of the second cylinder head.

Further areas of applicability of the present teachings will become apparent from the detailed description provided hereinafter. It should be understood that the detailed description and specific examples, while indicating the various embodiments of the invention, are intended for purposes of illustration only and are not intended to limit the scope of the teachings.

BRIEF DESCRIPTION OF THE DRAWINGS

The present teachings will become more fully understood from the detailed description, the appended claims and the accompanying drawings, wherein:

FIG. 8A is an exploded assembly view of the frame and integrated air box of FIG. 3 coupling to the intake system of the engine with the gasket;

FIG. 10B is partial exploded assembly view of the air filtration system of the integrated frame and air box of FIG. 4;

DETAILED DESCRIPTION OF THE VARIOUS EMBODIMENTS

The following description of the various embodiments is merely exemplary in nature and is in no way intended to limit the teachings, their application, or uses.

Figure 1:
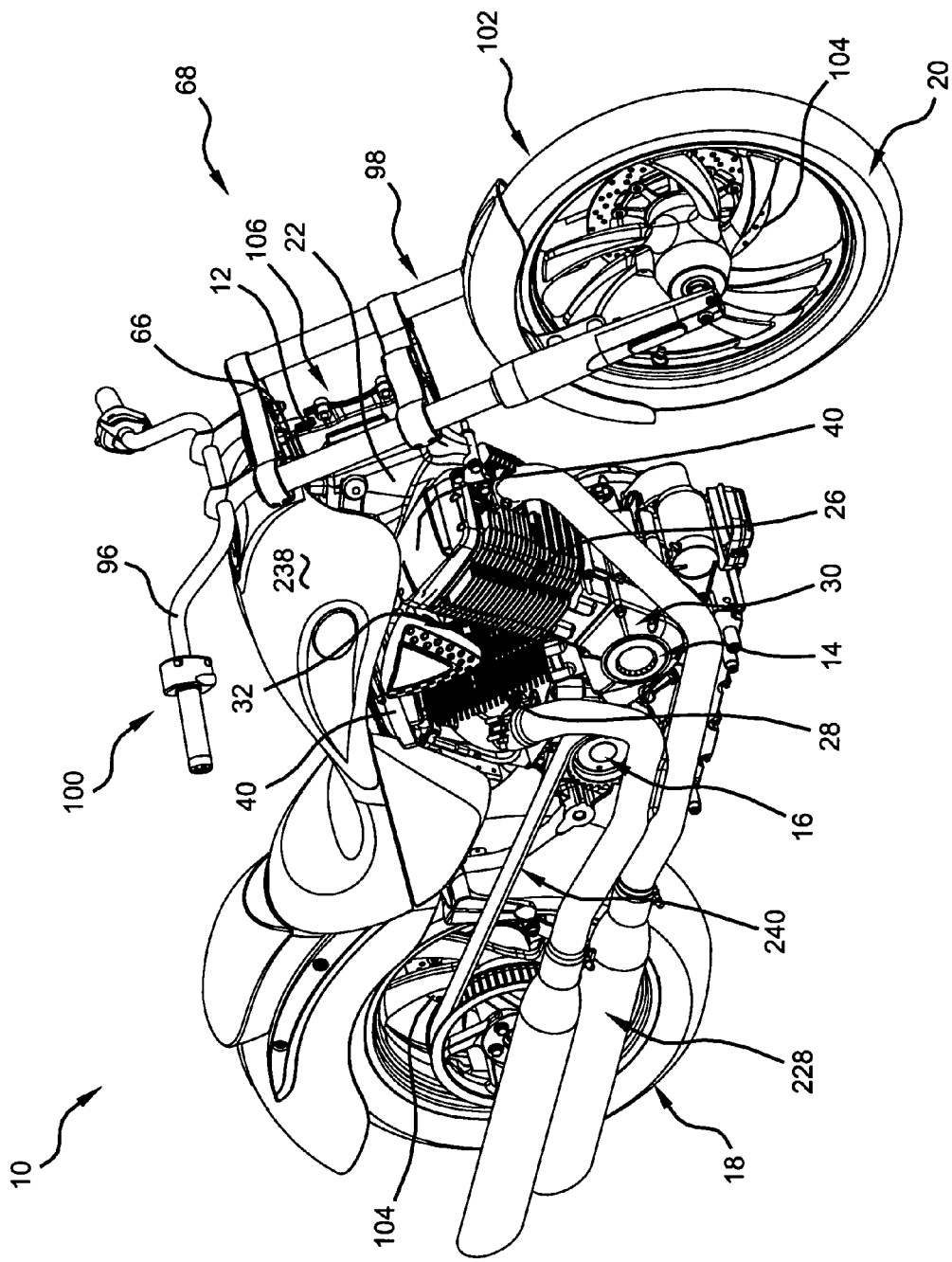
FIG. 1 is a perspective view of a motorcycle constructed in accordance with the present teachings showing an integrated frame and air box.
Figure 2:
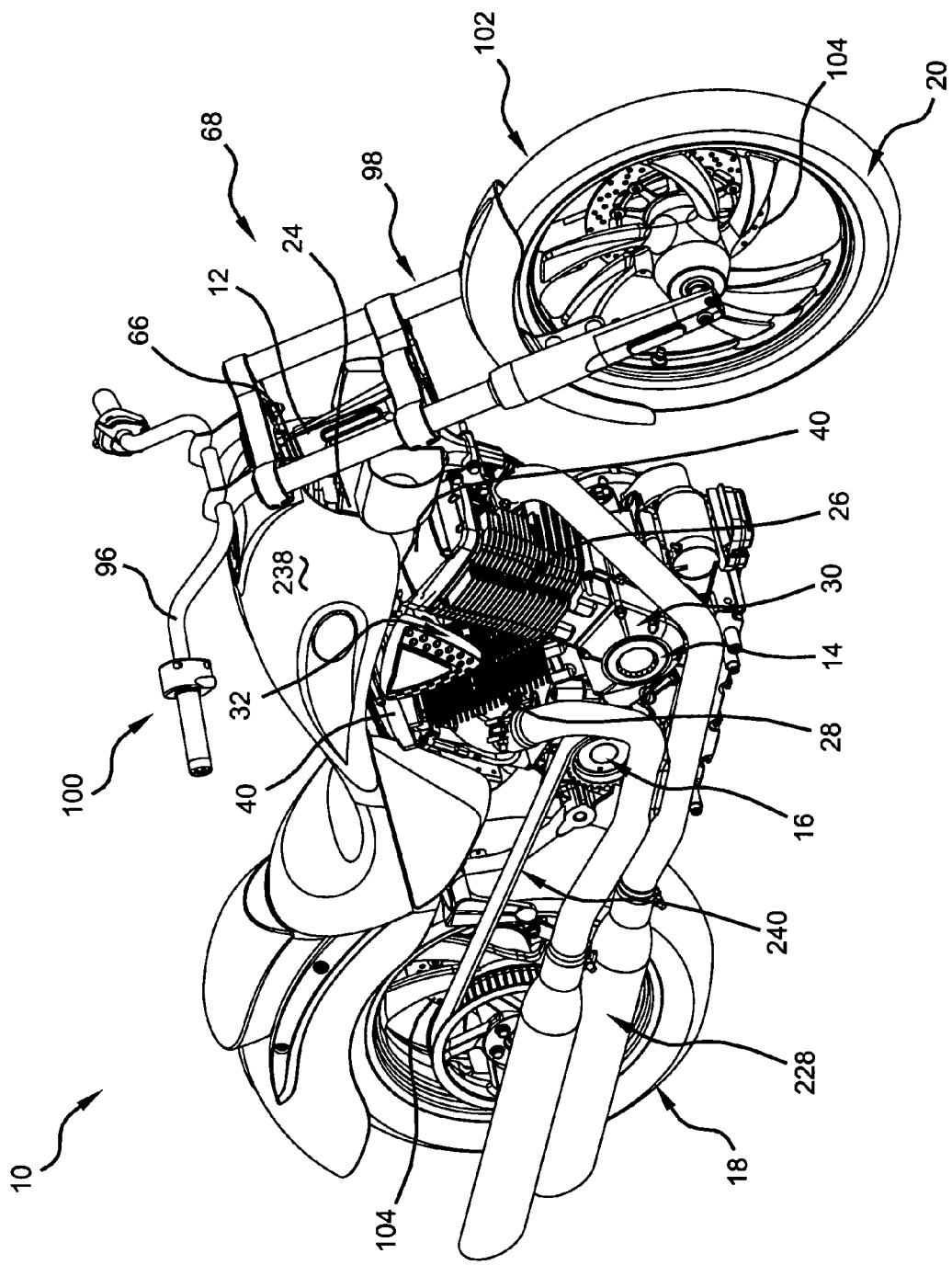
FIG. 2 is similar to FIG. 1 and shows an alternative construction of the integrated frame and air box.

With reference to FIGS. 1 and 2, a motorcycle 10 includes a frame 12, an engine 14 and a transmission 16, which provide a torque output to a driven wheel 18 and an optionally-driven wheel 20 in a manner known in the art. It will be appreciated that while the motorcycle 10 is illustrated, various embodiments of the present teachings are also operable with three, four, six etc. -wheeled vehicles. It will also be appreciated that while a spark-ignition gasoline engine is illustrated, electric motors, internal combustion engines without throttles and other suitable torque-generating machines are operable with various embodiments of the present teachings.

In one example and with reference to FIG. 1, the frame 12 of the motorcycle 10 includes an air box 22 that is integral with the frame 12. In another example and with reference to FIG. 2, the frame 12 of the motorcycle 10 includes an air box 24 that is integral with the frame 12. It will be appreciated that the air box 22 and the air box 24 have various common features and/or components and will be discussed below with reference to either the air box 22 or the air box 24. It will also be appreciated that the air box 22 and the air box 24 each have unique features and/or components that will be discussed below with specific reference to each the air box 22 and the air box 24. It will be further appreciated that the unique features and/or components may be combined or exchanged between the air box 22 and 24.

With reference to FIGS. 1 and 2, the engine 14 may include a first or front cylinder head 26 and a second or rear cylinder head 28, which may couple to an engine block 30. It will be appreciated that the various embodiments of the present teachings are operable with engines having one, two three, four, five, six etc. cylinders and are also operable with engines not having cylinders (e.g. a Wankel engine). In one example, the engine is in a V-twin configuration, such that the engine 14 has the front cylinder head 26 and the rear cylinder head 28 angularly-spaced from one another defining a V-shaped space 32 in a manner known in the art. By way of the above example, the cylinder heads 26, 28 include cooling fins 34 that may provide passive cooling for the engine 14. In one example, the engine 14 may be liquid-cooled (oil and/or water) in addition to or in lieu of passive air cooling in a manner known in the art. As shown, the V-shaped engine defines first and second cylinders which extend along a longitudinal, or fore and aft, direction or axis of the motorcycle.

In one example and with reference to FIGS. 5A-6B, the cylinder heads 26, 28 have four sides 36 and each of the four sides 36 may define the cooling fins 34. Moreover, the cylinder heads 26, 28 have a top side 38. In one example, the top side 38 of the cylinder heads 26, 28 include a valve cover 40. By way of the above example, the valve cover 40 may cover at least two valves (not shown) that may be actuated by one or more camshafts and/or rocker arms and push rods (not shown) in a manner known in the art. In one example, the top side 38 of the cylinder heads 26, 28 may have a cover plate (not shown) or an integral top portion with no plate and in either example the plate or top portion may not cover or house valves (e.g., an engine where valves are in the block). By way of the above example, the valve cover 40 may include a valve cover gasket 42 (FIG. 5A) and a plurality of fasteners that may secure the valve cover 40 to each of the cylinder heads 26, 28.

Figure 5A:
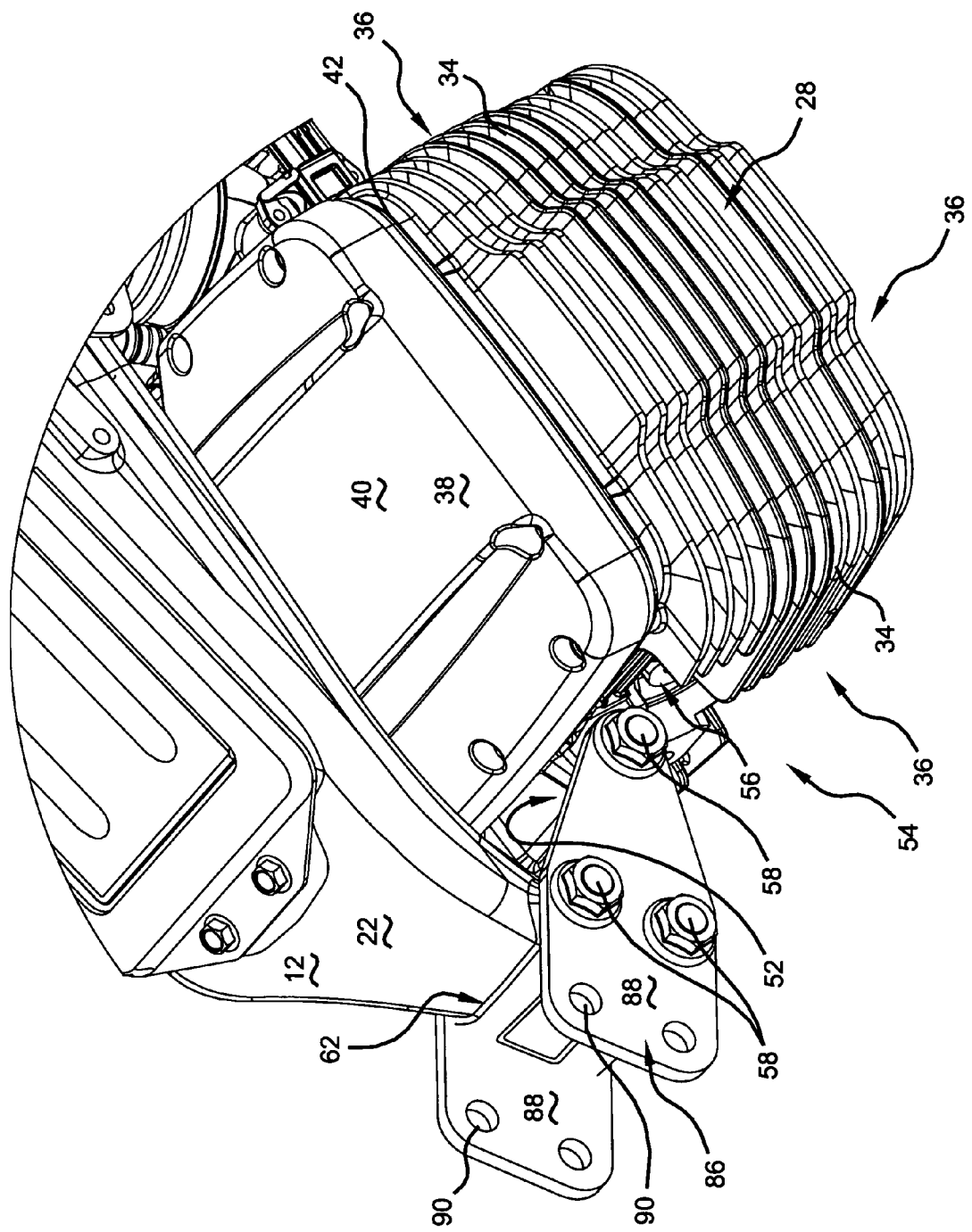
FIG. 5A is a perspective view of the integrated frame and air box of FIG. 3 coupling to a rear cylinder head of an engine.
Figure 5B:
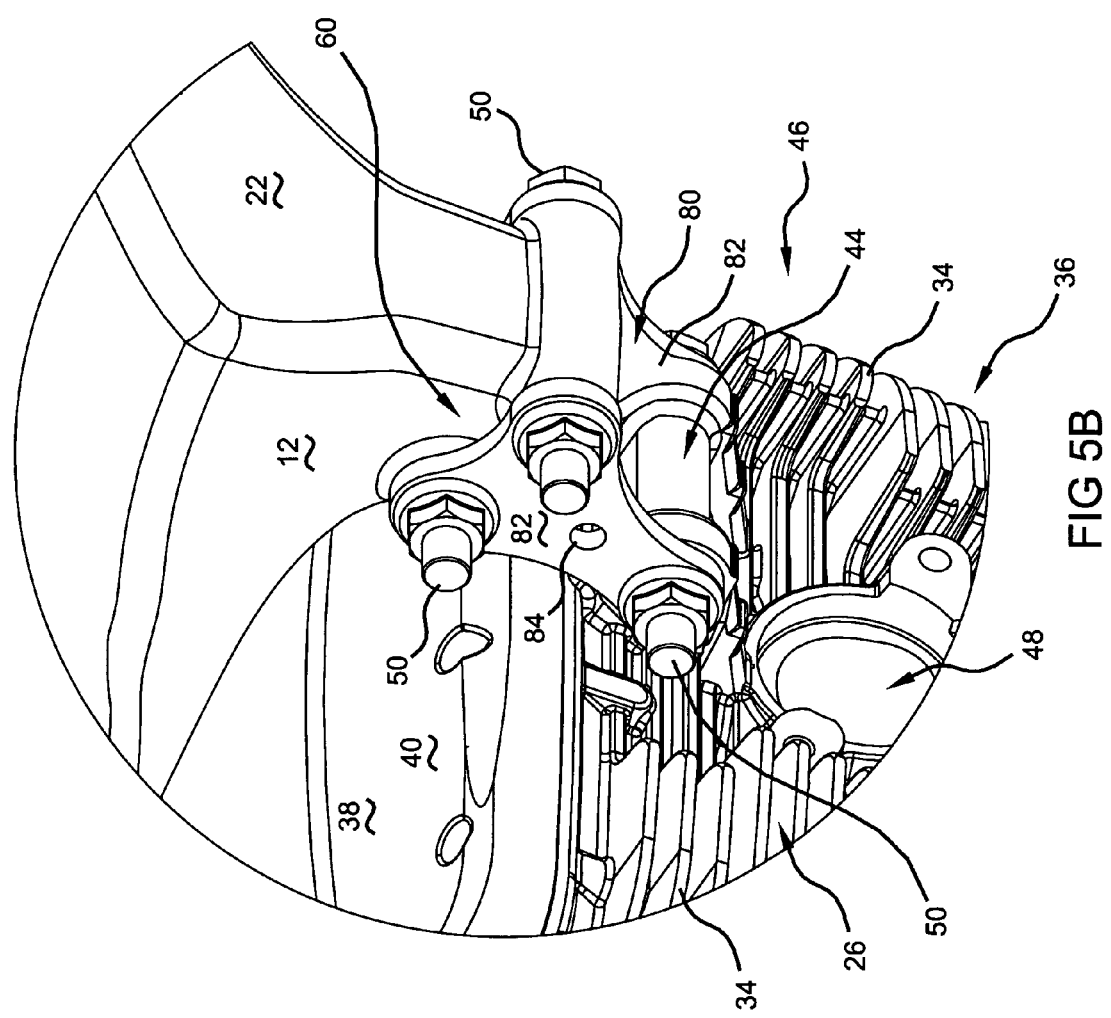
FIG. 5B is a perspective view of the integrated frame and air box of FIG. 3 coupling to a front cylinder head of the engine.
Figure 6A:
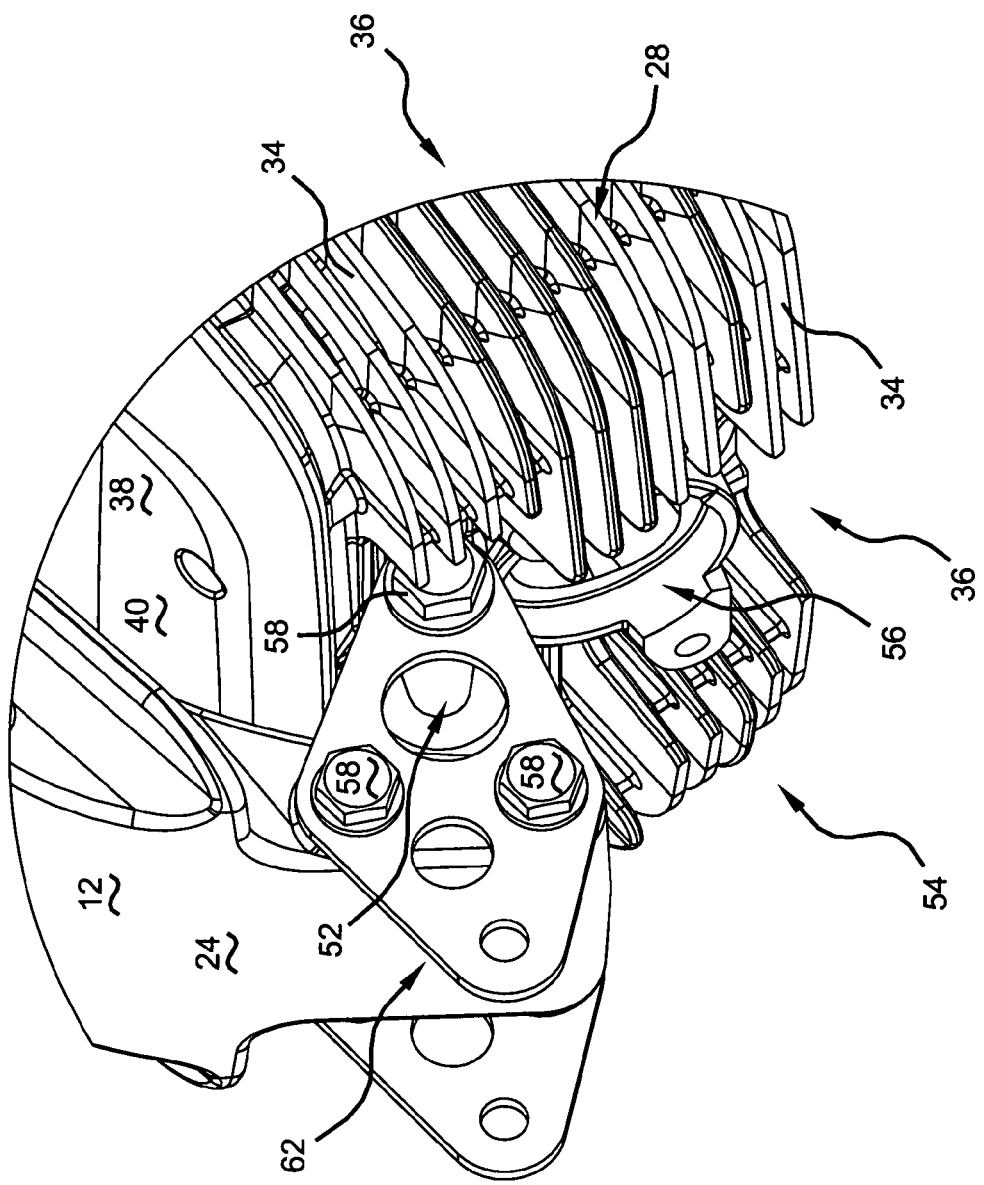
FIG. 6A is a perspective view of the integrated frame and air box of FIG. 4 coupling to the rear cylinder head of the engine.
Figure 6B:
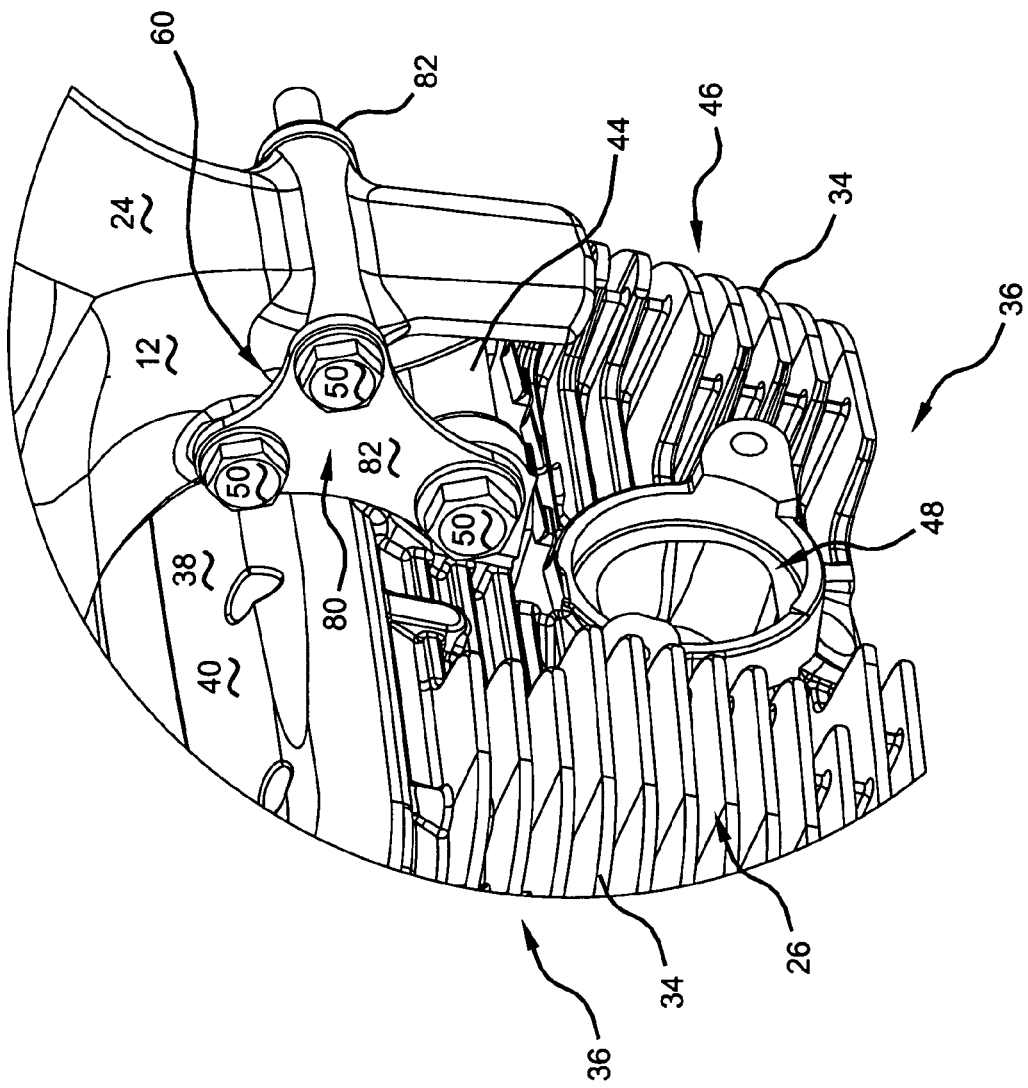
FIG. 6B is a perspective view of the integrated frame and air box of FIG. 4 coupling to the front cylinder head of the engine.

In one example with reference to FIGS. 5B and 6B, the front cylinder head 26 may include a frame-mounting boss 44. By way of the above example, a front wall 46 (relative to a front of the motorcycle 10) of the front cylinder head 26 defines the frame-mounting boss 44 and an exhaust port 48. The frame-mounting boss 44 may define a bore (not shown) through which a suitable fastener 50 may pass.

In one example with reference to FIGS. 5A and 6A, the rear cylinder head 28 may include a frame-mounting boss 52. By way of the above example, a rear wall 54 (relative to a rear of the motorcycle 10) of the rear cylinder head 28 defines the frame-mounting boss 52 and an exhaust port 56. The frame-mounting boss 52 may define a bore (not shown) through which a suitable fastener 58 may pass. It will be appreciated that by excluding frame-mounting bosses from the valve cover 40 and/or an area around the top side 38 of the cylinder heads 26, 28, forces exerted by the frame 12 are no longer telegraphed through the valve cover 40. Because the forces are no longer telegraphed through the valve cover 40, a propensity for the valve cover 40 and/or valve cover gasket 42 to develop leaks may be reduced.

Figure 3:
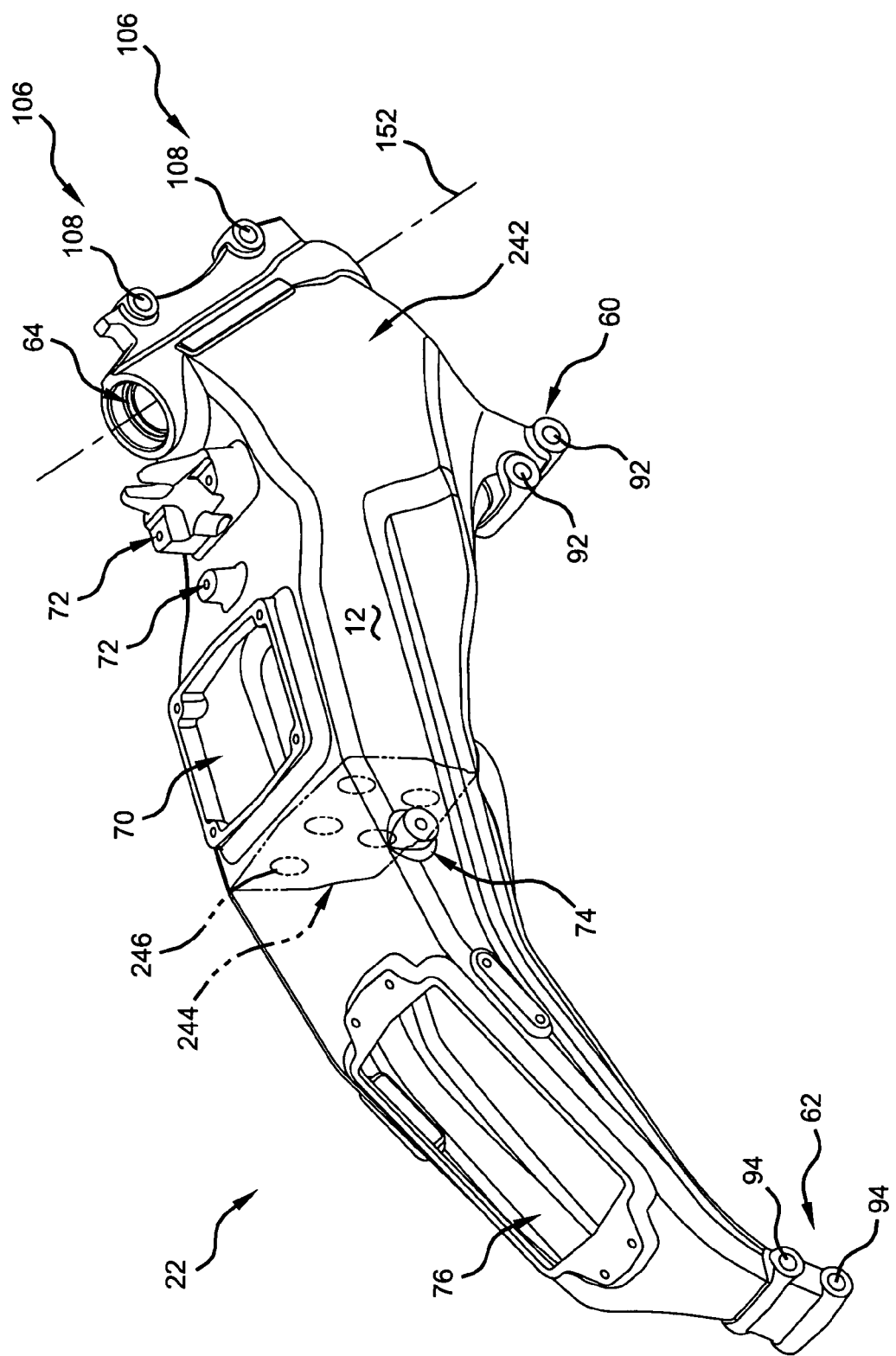
FIG. 3 is a perspective view of the integrated frame and air box of FIG. 1.

In one example and with reference to FIG. 3, the frame 12 of the motorcycle 10 includes the air box 22, which is an integral portion of the frame 12. In another example and with reference to FIG. 4, the frame 12 of the motorcycle 10 includes the air box 24 which is an integral portion of the frame 12. In one example and with reference to FIGS. 3 and 4, the air box 22, 24 defines a front boss 60 that may couple to the front cylinder head 26 of the engine 14 (FIGS. 5B and 6B). The air box 22, 24 also defines a rear boss 62 that may couple to the rear cylinder head 28 of the engine 14 (FIGS. 5A and 6A). The air box 22, 24 also defines a fork journal 64 that receives a steering tube 66 included in a steering assembly 68 (FIGS. 1 and 2). The air box 22, 24 further defines a maintenance access aperture 70, a plurality of accessory mounting bosses 72 and a plurality of gas tank mounting bosses 74. In one example and with reference to FIG. 3, the air box 22 includes a rear intake aperture 76. In one example and with reference to FIG. 4, the air box 24 includes a front intake aperture 78. By way of the above example, the air box 24 may include two front intake apertures 78, which are located proximate the front journal 64.

In one example and with reference to FIGS. 5B and 6B, the front boss 60 of the air box 22, 24 couples to the frame-mounting boss 44 on the front cylinder head 26. By way of the above example, a front mounting flange 80 may couple the front boss 60 of the air box 22, 24 to the frame-mounting boss 44 on the front cylinder head 26. The front mounting flange 80 may include two planar and generally parallel plates 82 each defining a plurality of holes 84 (one of which is illustrated in FIG. 5B). With reference to FIGS. 5A and 6A, the rear boss 62 of the air box 22, 24 couples to the frame-mounting boss 52 on the rear cylinder head 28. By way of the above example, a rear mounting flange 86 may couple the rear boss 62 of the air box 22, 24 to the frame-mounting boss 52 on the rear cylinder head 28. The rear mounting flange 86 may include two planar and generally parallel plates 88 each defining a plurality of holes 90.

Figure 4:
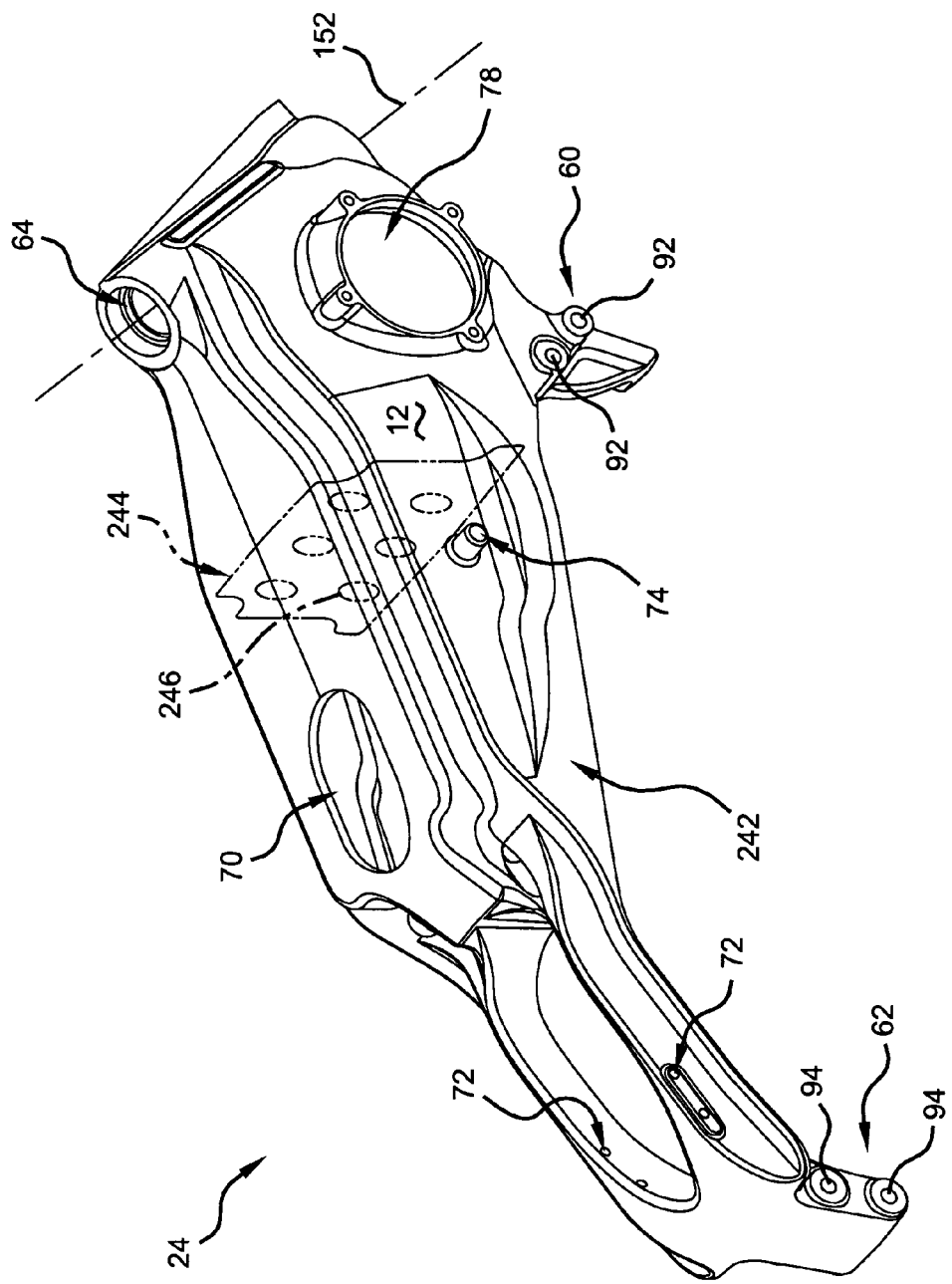
FIG. 4 is a perspective view of the integrated frame and air box of FIG. 2.

In one example and with reference to FIGS. 5B and 6B, the front boss 60 defines two bores 92 (FIGS. 3 and 4). The front cylinder head 26 defines a single mounting bore (not shown) defined by the frame-mounting boss 44. A plurality of the suitable fasteners 50 may releaseably couple the front boss 60 to the frame-mounting boss 44 with the respective plates 82 of the front flange 80. In one example, the plates 82 may be fixedly coupled or integral to the air box 22, 24. In another example, the plates 82 may be fixedly coupled or integral to the front cylinder head 26.

In one example and with reference to FIGS. 5A and 6A, the rear boss 62 defines two bores 94 (FIGS. 3 and 4). The rear cylinder head 28 defines a single mounting bore (not shown) defined by the frame-mounting boss 52. A plurality of the suitable fasteners 58 may releaseably couple the rear boss 62 to the frame-mounting boss 52 with the respective plates 88 of the rear flange 86. In one example, the plates 88 may be fixedly coupled or integral to the air box 22, 24. In another example, the plates 88 may be fixedly coupled or integral to the rear cylinder head 28.

In one example and with reference to FIGS. 1-4, the air box 22, 24 defines the fork journal 64, which receives the steering assembly 68 for rotation therein. The steering assembly 68 may include handlebars 96, a front suspension 98 and/or a front wheel or non-driven wheel 20. In one example, the steering assembly 68 may also include a throttle control 100 connected to the handlebars 96. In another example, a braking system 102 may include brake rotors 104 coupled for rotation with the front and/or rear wheels 20, 18. In one example and with reference to FIGS. 1 and 3, the air box 22 may also define one or more front mounting bosses 106 proximate the fork journal 64. The front mounting boss 106 may define a bore 108 through the boss 106. By way of the above example, various motorcycle components may couple to the front mounting boss 106.

Figure 7:
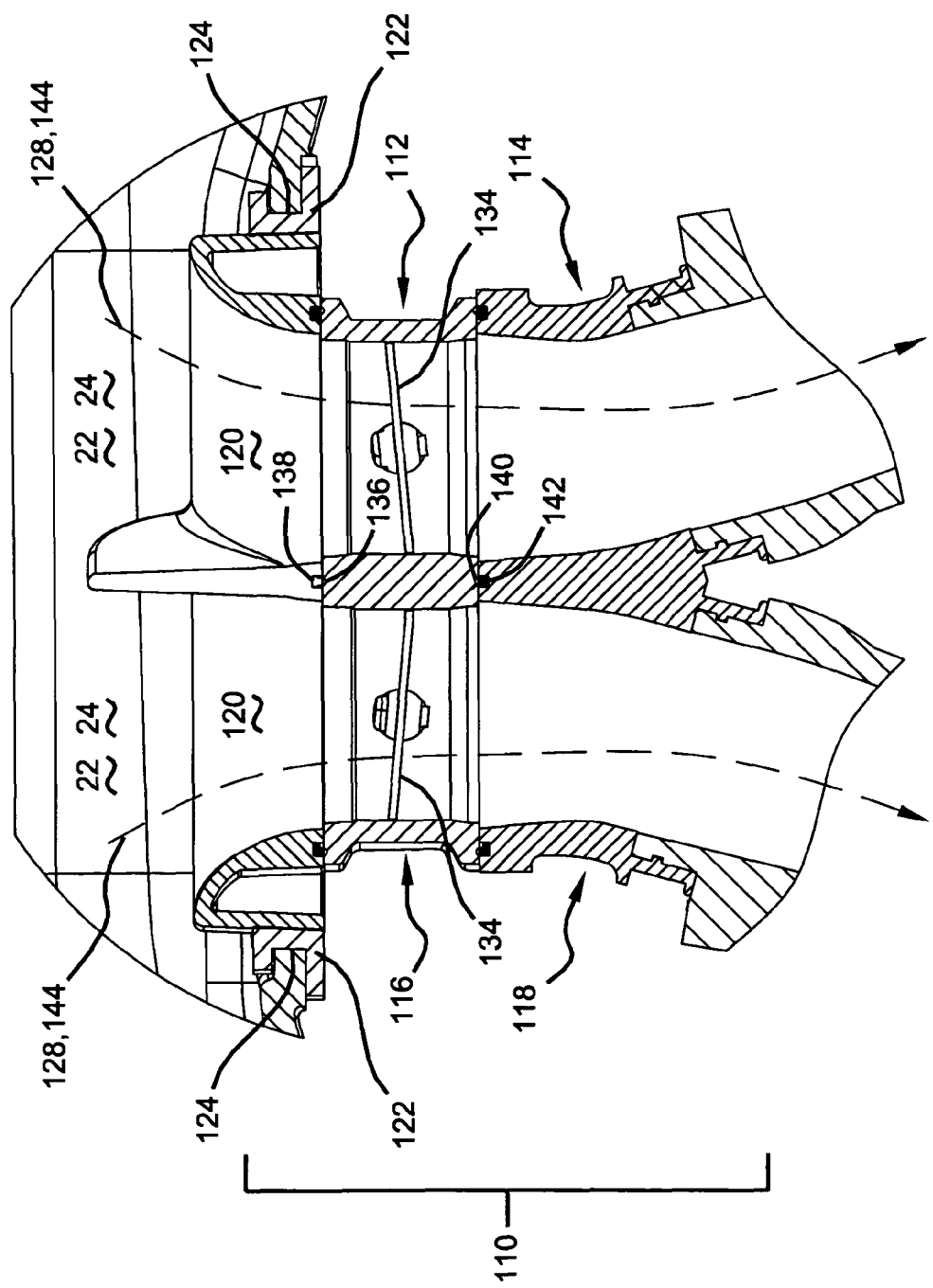
FIG. 7 is a cross-sectional view of the frame and integrated air box of FIGS. 3 and 4 coupling to an intake system of the engine with a gasket.
Figure 8B:
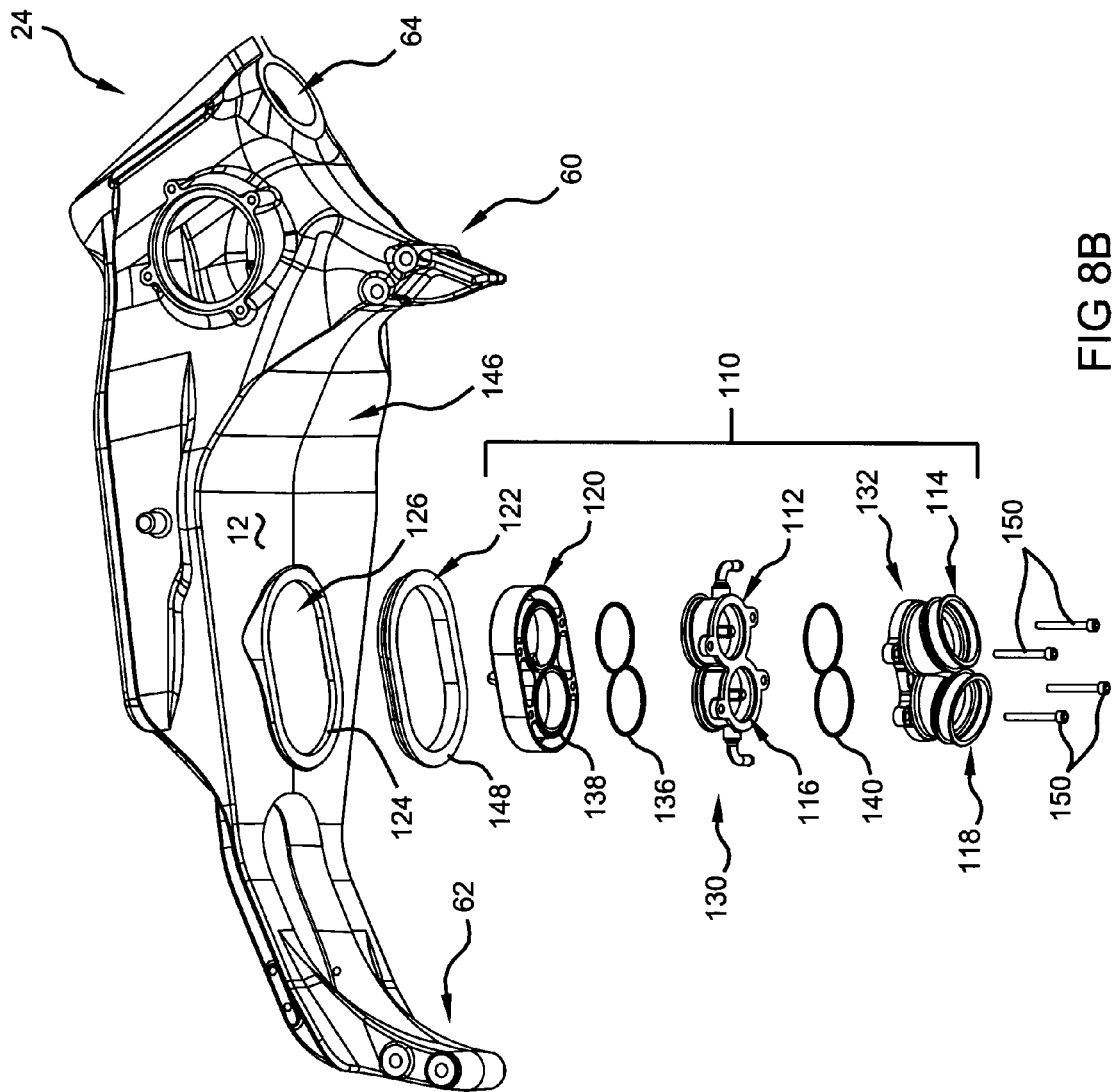
FIG. 8B is an exploded assembly view of the frame and integrated air box of FIG. 4 coupling to the intake system of the engine with the gasket.

In one example with reference to FIGS. 7, 8A and 8B, the air box 22, 24 couples to an intake system 110 that couples to the engine 14. The intake system 110 may include a first throttle body 112 that connects to a first intake runner 114, which couples to an intake port (not shown) on the front cylinder head 26 (FIGS. 1 and 2). The intake system 110 may also include a second throttle body 116 that connects to a second intake runner 118, which couples to an intake port (not shown) on the rear cylinder head 28 (FIGS. 1 and 2). The throttle bodies 112, 116 may couple to an intake manifold 120. The intake manifold 120 may seal to and engage to an air box gasket 122, which also seals to and engages a lip 124. The lip 124 defines a periphery of an output aperture 126 formed in the air box 22, 24. In one example, a single output aperture 126 is formed by the air box 22, 24 and is sized to accept at least a portion of the intake manifold 120. By way of the above example, an air flow 128 may develop between the intake aperture 76, 78 through the air box 22, 24 and out of the output aperture 126.

In one example, each of the throttle bodies 112, 116 may be individually formed as two separate units (not shown) or formed in a common throttle body housing 130. In a further example, the intake system may have one or more of the common throttle body housings 130 and/or one or more of the individually formed throttle bodies (e.g., engines with more than two cylinders). In one example, the intake runners 114, 118 may also be formed either as individual formed runners (not shown) or as multiple runners in a runner housing 132. Whether formed as two separate throttle bodies 112, 116 and/or as a throttle body assembly 130, each throttle body 112, 116 includes a restrictor plate 134 that is coupled for rotation within the throttle body 112, 116. The restrictor plate 134 may be selectively rotated to a plurality of positions to restrict or open (i.e., throttle) the throttle body 112, 116 in a manner known in the art.

In one example, a gasket 136 seals the throttle body housing 130 to the intake manifold 120. By way of the above example, a channel 138 defined in the intake manifold 120 may receive the gasket 136 or other suitable sealing member. In another example, a gasket 140 seals the throttle body housing 130 to the runner housing 132. By way of the above example, a channel 142 defined in the runner housing 132 may receive the gasket 140 or other suitable sealing member. When the intake system 110 is assembled, a sealed flow path 144 is formed so that the airflow 128 may flow through the air box 22, 24 and into the engine 14. In one example, the intake system 110 is positioned in the space 32 (FIGS. 1 and 2) defined between the "V" of the front and rear cylinder heads 26, 28. In one example, a fuel injection system (i.e., a pressurized fuel system), one or more carburetors and/or other suitable forms of fuel management may be used in a manner known in the art.

By way of the above examples, a bottom side 146 of the air box 22, 24 includes the lip 124, to which the air box gasket 122 couples. The air box gasket 122 includes a generally annular groove 148 that releaseably (or fixedly) couples to the lip 124 on the air box 22, 24. Moreover, the air box gasket 122 may seal against and/or be bonded to the intake manifold 120. It will be appreciated that the air box gasket 122 couples the intake system 110 to the air box 22, 24 without having any mechanical fasteners or other separate fasteners in the sealed flow path 144. Because the sealed flow path 144 is free of any fasteners, clips or the like, loose fasteners etc. may not foul the intake system 110. In one example, four fasteners 150 fasten the intake runner housing 132 to the throttle body housing 130 and ultimately couple to the intake manifold 120. It will also be appreciated that the fasteners 150 remain completely exterior to the sealed flow path 144.

In one example with reference to FIGS. 3 and 4, the air box 22, 24 is aligned for coupling with the intake system 110 (FIG. 7) by coupling the air box 22, 24 to each cylinder head 26, 28 (FIGS. 5A-6B). By way of the above example, the bosses 60, 62 of the air box 22, 24 couple to the mounting bosses 44, 52 formed on the cylinder heads 26, 28, which, in turn, position the bottom side 146 of air box 22, 24 so that the air box gasket 122 seals against the intake manifold 120. It will be shown that a point-to-point dimensional tolerance between the front boss 60 and the rear boss 62 are sufficiently small (i.e., tight) to position and seal the air box gasket 122 against the intake manifold 120. It will be appreciated that the air box gasket 122 may allow relative motion between the engine 14 and air box 22, 24 (e.g. engine vibration). As such, the above-described point-to-point tolerance may be shown to be sufficiently small (i.e. tight) to prevent unsealing the air box gasket 122 from the intake manifold 120, thus breaking the sealed flow path 144 therethrough.

In one example, a dimensional point-to-point tolerance between the front boss 60 and the rear boss 62 is about ±0.5 millimeters (about ±0.02 inches). In a further example, a longitudinal axis 152 (shown in phantom) defined by the fork journal 64 defines a plurality of points. A dimensional point-to-point tolerance between a point on the longitudinal axis 152 and the bosses 60, 62 is about ±0.5 millimeters. It will be appreciated that a point-to-point dimensional tolerance may be, for example, based on a range. The range defines an acceptable band in which multiple measurements of the same dimension must reside. Each dimension may, for example, define a distance measured between the two points on the air box 22, 24. By measuring the same two points on multiple air boxes (e.g., a suitable sample size) a point-to-point tolerance may be defined. It will be shown that a point-to-point tolerance of about ±0.5 millimeters (about ±0.02 inches) exists between the front boss 60, the rear boss 62, the longitudinal axis 152 though the fork journal 64 and other points within the air box 22, 24. In contrast, typical tubular frames may have a point-to-point tolerance of about ±2.5 millimeters (about ±0.1 inches).

Figure 9:
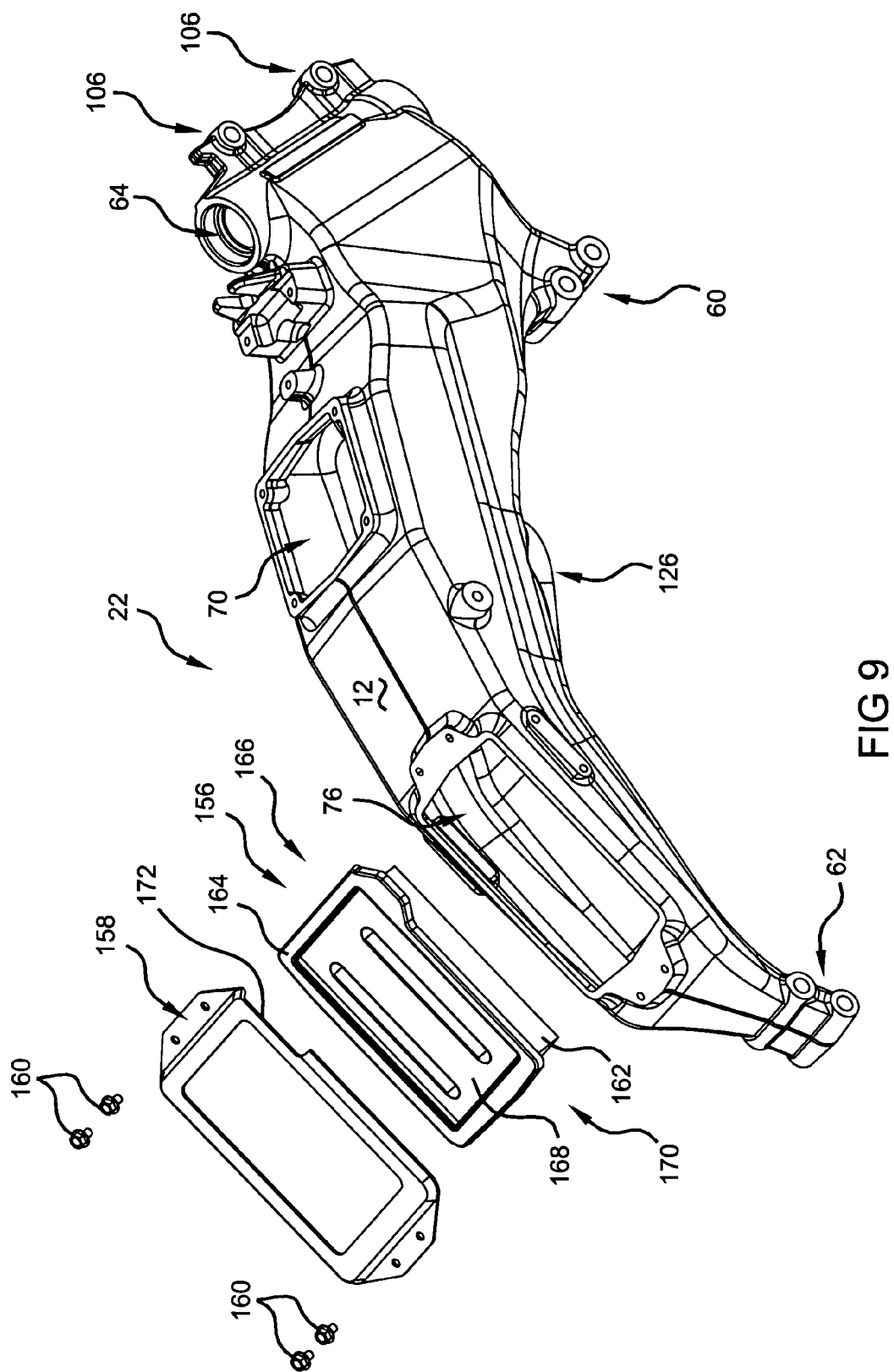
FIG. 9 is a perspective view of the air filtration system of the integrated frame and air box of FIG. 3.

With reference to FIGS. 9 and 10, the air box 22, 24 may include an air filtration system 154 coupled to a portion of the air box 22, 24 that defines an intake aperture 76, 78. In one example and with reference to FIG. 9, the air box 22 may have the rear intake aperture 76 (i.e., relative to the rear of the motorcycle 10) that may receive the air filtration system 154. In one example, the rear intake aperture 76 may be rectangular (as illustrated), circular or other suitable polygonal shape. The shape of the rear intake aperture 76 may be complementary to the air filtration system 154 and/or an adapter (not shown) may couple the rear intake aperture 76 to the air filtration system 154.

The air filtration system 154 may include a filter assembly 156 that includes cover plate 158 that secures the filter assembly 156 to the air box 22 with a plurality of fasteners 160. The filter assembly 156 may further include a filter member 162 that may have a sealing lip 164. In one example, the filter assembly 156 may be formed of multiple layers 166. In one example, the filter assembly 156 may include a wire mesh material 168 that may provide relatively more structural integrity to the filter assembly 156. In one example, the filter member 162 may be a pleated air-filter, a cellulose filter and/or other suitable filter materials. In another example, the filter assembly 156 may include multiple filter members. In one example, the filter member 162 may be packaged as a single filter assembly 170 and conform to a groove 172 in the cover plate 158.

Figure 10A:
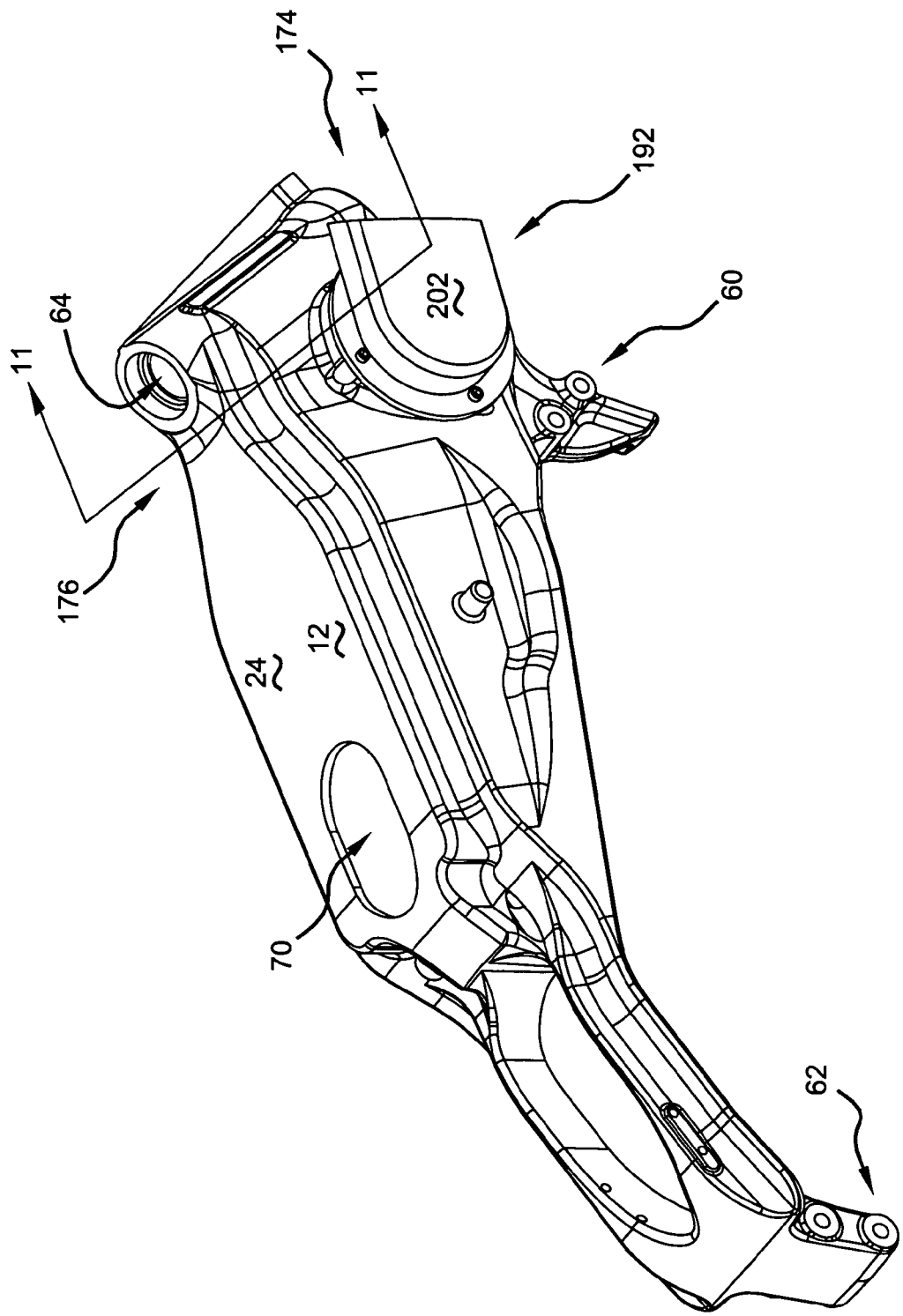
FIG. 10A is a perspective view of the air filtration system of the integrated frame and air box of FIG. 4.
Figure 11:
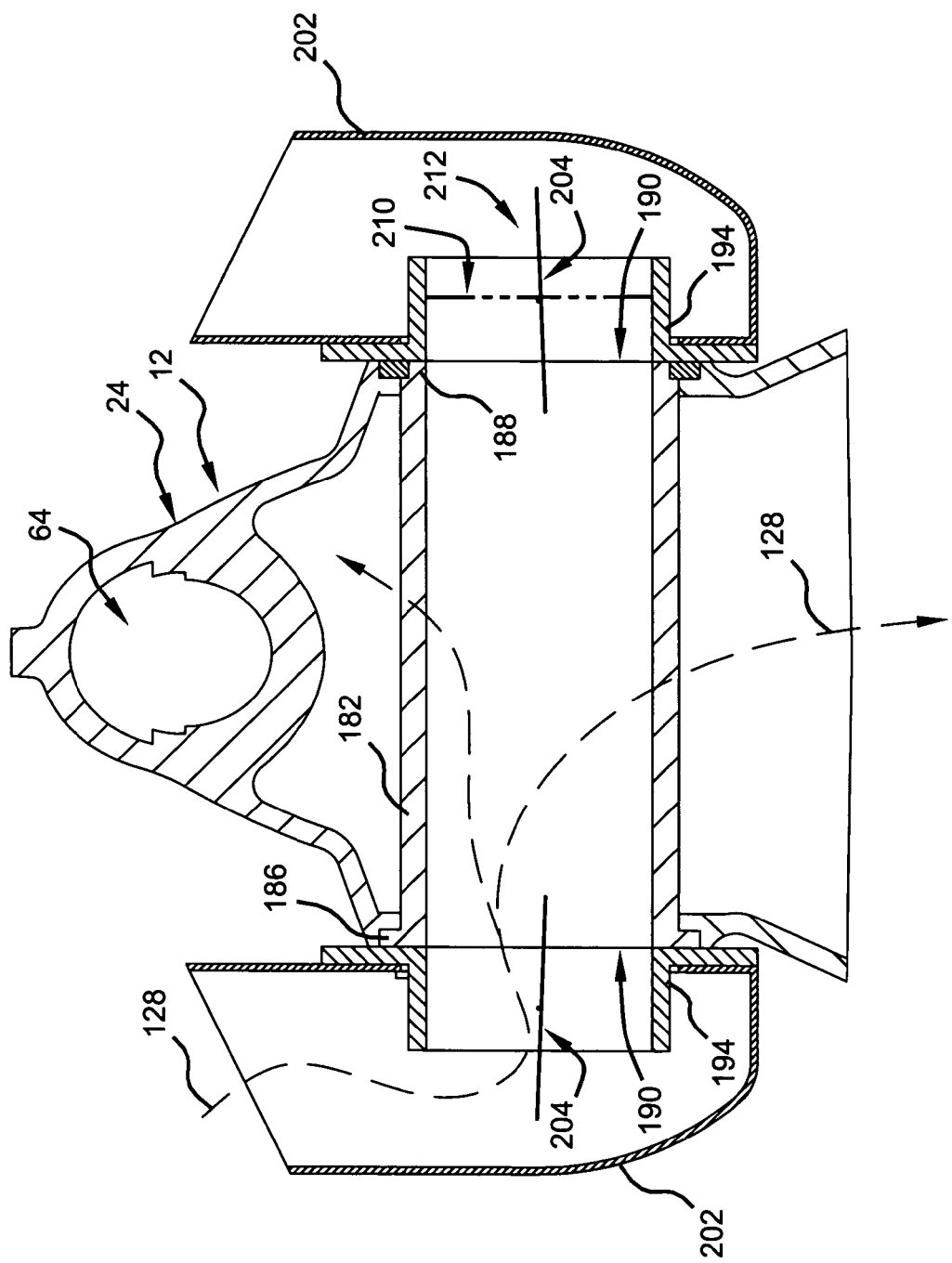
FIG. 11 is a cross-sectional view of a portion of the view from FIG. 10A.

In one example and with reference to FIGS. 10A, 10B and 11, the air box 24 defines the front intake aperture 78. In a further example, the air box 24 defines an exhaust-side intake aperture 174 and a non-exhaust-side aperture 176, which may be collectively referred to as the front intake apertures 78. The front intake aperture 78 may be about round, rectangular or other suitable polygonal-shapes. The front intake aperture may be positioned proximate the fork journal 64.

In one example, two front intake apertures 78 may receive an air filtration system 154. The air filtration system may include a filter assembly 178 that couples to the air box 24. In one example, the front intake apertures 78 are arranged about coaxial (about an axis 180) so that the filter assembly 178 may pass through both of the front intake apertures 78. The filter assembly 178 may include a filter member 182 and a retainer member 184. The retainer member 184 may couple the filter member 182 to the air box 24. In one example, the filter member 182 may have a lip portion 186 and an engagement end 188. In a further example, the filter member 182 may be formed in a cylindrical-shape.

In one example, the filter member 182 is inserted into one of the front intake apertures 78 (e.g., the exhaust-side aperture 174). The lip portion 186 engages one of the front intake apertures 78 (e.g., the exhaust-side aperture 174). The engagement end 188 of the filter member 182 may engage the retainer member 184, which may be coupled to the opposite front intake aperture 78 (e.g., the non-exhaust-side aperture 176). In one example, the engagement end 188 includes mechanical threads that engage complementary mechanical threads on the retainer member 184, thereby securing the filter member 182 in the air box 24. The air flow 128 is, for example, from the ambient air into the open ends 190 of the cylindrical filter member 182 and through the filter member 182 into the air box 24.

In one example, a scoop assembly 192 is coupled to the air box 24 and covers the filter assembly 178. The scoop assembly 192 includes a base plate 194 that surrounds the filter assembly 178 and defines a plurality of holes 196. A plurality of suitable fasteners 198 may be received by a plurality of apertures 200 formed in the air box 24 around the front intake aperture 78 to thereby couple the base plate 194 to the air box 24. The scoop assembly may also include a housing 202 that couples to the base plate 194. The housing 202 may be shaped to funnel air into the filter assembly 178. The housing 202 may fasten, snap to or couple to the base plate 194 in various suitable ways.

In one example, the scoop assembly 192 may include a valve or baffle assembly 204. The baffle assembly 204 may include a shaft 206 and a restrictor plate 208. The shaft 206 may rotate the restrictor plate 208 between an about closed position 210 (shown in phantom) to an about open position 212 and a plurality of positions therebetween. In one example, the shaft 206 may be connected to a motor 214 (FIG. 12) that may rotate the shaft 206 to any of the above-described positions. In another example, the shaft 206 may mechanically couple to the intake system and be moved through the above-described positions via a mechanical linkage. By way of the above example, the shaft 206 may be mechanically engaged to one or more of the throttle bodies 112, 116.

Figure 12:
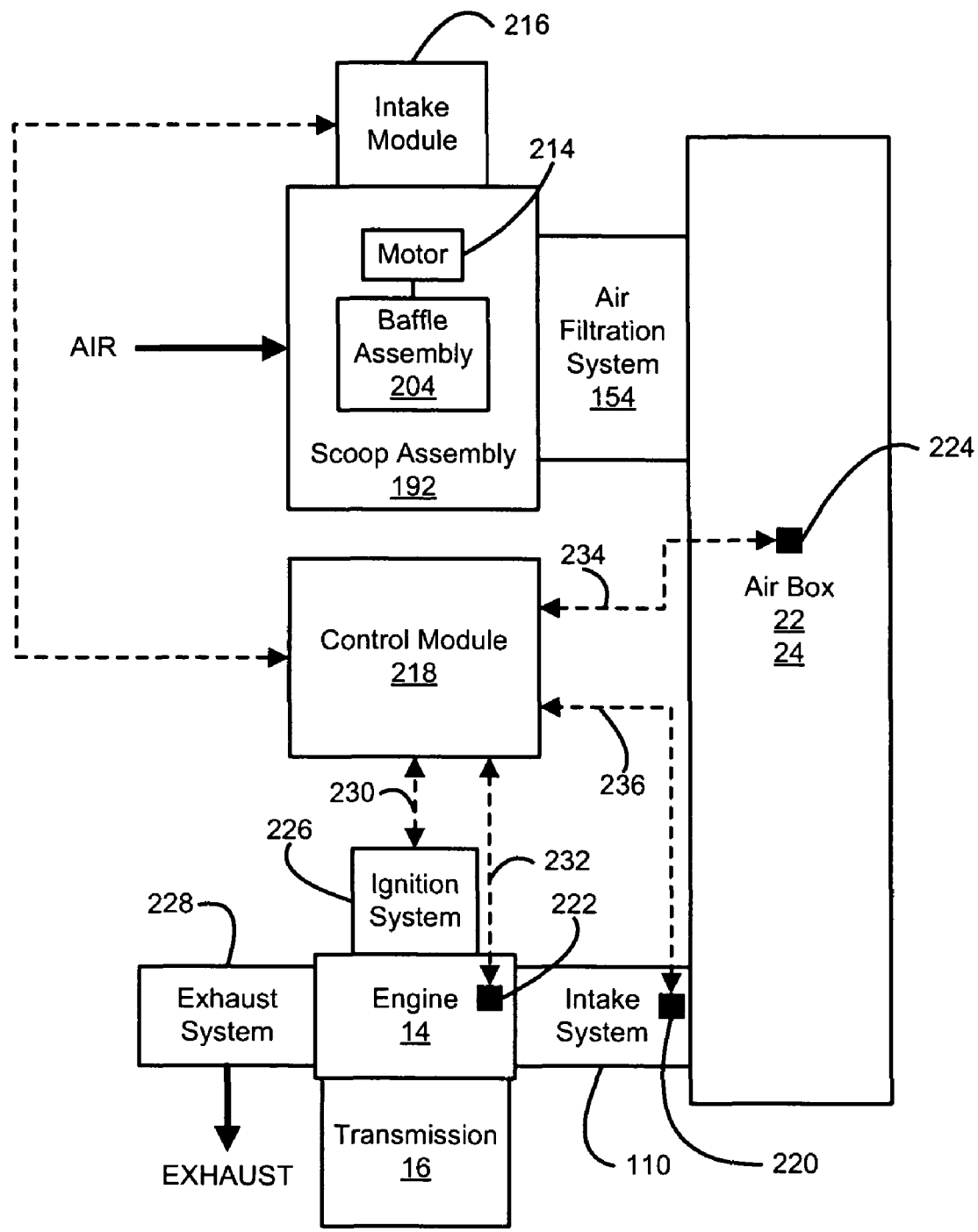
FIG. 12 is an exemplary schematic of a control system for the air filtration system of FIGS. 10A, 10B and 11.

In one example and with reference to FIG. 12, the scoop assembly 192 includes an intake module 216 that may communicate with a control module 218. The motor 214 may engage the shaft 206 and move the restrictor plate 208 to any of the above-described positions. The control module 218 may communicate with an intake system sensor 220, an engine sensor 222, an air box sensor 224 and an ignition system 226. In one example, the baffle assembly 204 on the side of the motorcycle 10, which contains an exhaust system 228, may control the restrictor plate 208 to the about closed position 210 (FIG. 11) based on an engine load. By way of the above example, the baffle assembly 204 may close an intake aperture 78 when the engine 14 is at the engine load indicative of an idle condition. It will be shown that by closing the intake aperture 78, intake noise from the air box 24 may be reduced.

In one example, the engine load may be based on a signal 230 from the ignition system 226 that may indicate idle engine load. In another example, the engine load may be based on a signal 232 from engine 14 that may indicate an engine idle (or minimum) speed. In a further example, the engine load may be based on a signal 234 from the air box sensor 224 and/or a signal 236 from an intake system sensor 220. The signals 234 and/or 236 may indicate an air flow and/or an air pressure that may indicate an idle engine speed and/or a low load on the engine 14.

In one example, the air filtration systems 154 in the rear intake aperture 76 and the front intake apertures 78 remain accessible and/or removable (e.g., to maintain the air filter) after mounting of a gas tank 238 to the motorcycle. As such, the gas tank 238 need not be removed from the motorcycle to service, access and/or inspect the air filtration system 154.

In one example, the air box 22, 24 is fabricated from a single casting and thus has a unitary construction. It will be appreciated that the single casting, relative to the tubular frame construction of typical motorcycles, provides increased structural rigidity for the air box 22, 24. Moreover, it will be shown that the increased structural rigidity, relative to the aforesaid tubular construction, provides reduced noise production due to the increased structural rigidity. In one example, the control module 218 may control the scoop assembly 192 to move the baffle assembly 204 to the closed condition 210 to further reduce intake noise from the air box 22, 24. By moving the baffle assembly 204 to the closed condition 210, airflow 128 is restricted through the air filtration system 154.

In one example, the air box 22, 24 may be made of aluminum. In other examples, the air box 22, 24 may be made of various suitable metals such as various forms of aluminum, steel, iron, titanium, other suitable metals and combinations thereof. In other examples, the air box 22, 24 may be made of suitable plastics or may be formed of a plastic and metal composite. By way of the above examples, the air box 22, 24 may also be fabricated as a multi-component structure that may be coupled (e.g., welded and/or fastened). In one example, an interior surface of the air box 22, 24 may be polished and/or prepared with other suitable surface finishes to relatively reduce air friction over the walls 242.

In the various examples, the air box 22, 24 of the motorcycle 10 provides the combined functionality of the air box 22, 24 and functionality of the frame 12. More specifically, the air box 22, 24 integrated into the frame 12 of the motorcycle 10 only extends from the fork journal 64 over the top of the engine 14 and connects with a rear frame assembly 240. As such, the typically full frame assembly that cradles the engine 14 is now absent. Even with less frame structure than a typical tubular frame, the air box 22, 24 integrated with the frame 12 of the motorcycle 10 will be shown to provide more than sufficient air to the engine 14. In one example, the air box 22, 24 provides approximately 500 cubic inches (approximately 8.2 liters) of air volume that can be directed into the intake system 110 of the engine 14. In contrast, an independent air box coupled to a typical tubular frame may have approximately 350 cubic inches (approximately 5.7 liters) of air volume that may be supplied to an engine.

In one example with reference to FIGS. 3 and 4, the air box 22, 24 may be cast in a suitable form of aluminum as a unitary structure. By way of the above example, the casting process may include sand casting. In various examples, the plurality of walls 242 that define the air box 22, 24 and the internal volume therein further define an internal plate 244 (shown in phantom). One or more internal plates 244 may be formed within the interior of the air box 22, 24. The internal plate 244 may be approximately normal to one of the walls 242 of the air box 22, 24 and may be formed such that the internal plate 244 is entirely and integrally formed with the interior walls 242 of the air box 22, 24 or only formed to a portion thereof. In another example, the internal plate 244 may be formed at a non-normal angle to the walls 242 of the air box 22, 24. The internal plate 244 may define one or more holes 246 (shown in phantom) through which air may pass. It will be shown that the internal plates provide improved structural rigidity with relatively little restriction in the air flow 128. In one example, torsional stiffness of frame 12 with the integral air box 22, 24 is about 3000 ft-lbs/deg. In contrast, a similarly configured motorcycle with a typical tubular frame has tubular stiffness of 1700 ft-lbs/deg. In another example, the internal plate 244 may be shown to reduce noise from the air box 22, 24.

It will be appreciated that with the air box 22, 24 integrated as a single frame member that there are less components relative to a typical motorcycle. In one example, the air box 22, 24 saves approximately nine pounds over a typical motorcycle configuration in a certain class of motorcycles. In one example, a dry weight of the motorcycle 10 having the frame 12 with the integral air box 22, 24 is about 611 lbs. (about 1347 kilograms). In contrast, a similarly configured motorcycle with a typical tubular frame is about 620 lbs. (about 1637 kilograms).

Those skilled in the art may now appreciate from the forgoing description that the broad teachings may be implemented in a variety of forms. Therefore, while the present teachings have been described in connection with particular examples thereof, the true scope of the teachings should not be so limited because other modifications will become apparent to the skilled practitioner upon a study of the drawings, the specification and the following claims.

What is claimed is:

1. A motorcycle having an engine with at least two cylinders, the motorcycle comprising:
    a first cylinder head having a first top portion and a first side portion;
    a second cylinder head having a second top portion and a second side portion, said first cylinder head and said second cylinder head associated with the engine; and
    a frame member defining an integral air box communicating air into the engine, said integral air box defining an intake aperture and a single output aperture, said single output aperture positioned in a bottom wall of said integral air box, wherein said engine is retained to said frame member by attachment of said first side portion of said first cylinder head and said second side portion of said second cylinder head to an underside of said frame member with the engine receiving air communicated from said single output aperture in said integral air box.

2. The motorcycle of claim 1 further comprising a filter assembly releaseably connected to a portion of said frame member that defines said intake aperture.

3. The motorcycle of claim 2 further comprising a fuel tank coupled to at least a portion of said frame member, said fuel tank spaced from said intake aperture such that said filter assembly is removable from said intake aperture without removing said fuel tank from said frame member.

4. The motorcycle of claim 2 further comprising a valve coupled to said filter assembly, said valve moveable to an open condition, a closed condition and a plurality of positions therebetween.

5. The motorcycle of claim 4 wherein said valve coupled to said air box reduces noise from said air box when in said closed position relative to said open position.

6. The motorcycle of claim 4 further comprising a control module that detects an engine load and controls said valve to one of said open condition, said closed condition and said positions therebetween based on said detection of said engine load.

7. The motorcycle of claim 6 wherein said detection of said engine load includes determining at least one of an ignition speed, an intake air pressure, a throttle position, a mass airflow and combinations thereof.

8. The motorcycle of claim 4 wherein said valve is located on a side of the motorcycle having an exhaust pipe.

9. The motorcycle of claim 1 wherein said air box defined by said frame member has a unitary construction.

10. The motorcycle of claim 9, wherein said frame member is a cast member having an integral head tube, and integral front and rear bosses for attachment to the engine.

11. A motorcycle comprising:
    an engine comprising two cylinders one positioned fore and one positioned aft in relation to a longitudinal direction of the motorcycle, the engine having an air intake system comprised of throttle bodies on an upper side of the engine intermediate the two cylinders;
    a cast unitary frame member defining an integral air box, said cast unitary frame member comprising a top wall, a bottom wall and sidewalls, said integral air box defining an intake aperture and an output aperture, said output aperture positioned in said bottom wall; said engine being attached to said cast unitary frame member, and retaining said throttle bodies against said output aperture;
    a filter assembly positioned within said integral air box and releaseably connected to a portion of said frame member and received by said intake aperture; and
    a fuel tank coupled to at least a portion of said frame member, said fuel tank spaced from said intake aperture such that said filter assembly is removable from said intake aperture without removing said fuel tank from said frame member.

12. The motorcycle of claim 11 further comprising a valve coupled to said filter assembly, said valve moveable to an open condition, a closed condition and a plurality of positions therebetween.

13. The motorcycle of claim 12 further comprising a control module that detects an engine load and controls said valve to one of said open condition, said closed condition and said positions therebetween based on said detection of said engine load.

14. The motorcycle of claim 13 wherein said detection of said engine load includes determining at least one of an ignition speed, an intake air pressure, a throttle position, a mass airflow and combinations thereof.

15. The motorcycle of claim 12 wherein said valve coupled to said air box reduces noise from said air box when in said closed position relative to said open position.

16. The motorcycle of claim 12 wherein said valve is located on a side of the motorcycle having an exhaust pipe.

17. A motorcycle, comprising:
    an air box integrally formed from a frame member, said frame member comprising a longitudinally extending member having a top and a bottom wall and sidewalls, said air box defining an intake aperture and an output aperture, said output aperture positioned in said bottom wall;
    an intake system positioned against the output aperture of the frame member;
    a two cylinder V-configured engine, with one cylinder positioned fore and one cylinder positioned aft, in relation to a longitudinal direction of the motorcycle, with said engine positioned against said intake system, and said intake system positioned intermediate the two cylinders;
    a valve assembly in communication with said intake aperture and selectively moveable between an about open position, an about closed position and a plurality of positions therebetween; and a control module that detects a load on the engine and that controls said valve to one of said open positions, said closed position and said positions therebetween based on said detection of said load on said engine.

18. The motorcycle of claim 17 wherein said detection of said engine load includes determining at least one of an ignition speed, an intake air pressure, a throttle position, a mass airflow and combinations thereof.

19. The motorcycle of claim 17 wherein said air box communicates air into the engine.

20. The motorcycle of claim 17 further wherein said valve is located on a side of the motorcycle having an exhaust pipe.

21. A motorcycle, comprising:
an air box integrally formed from a frame member, said frame member comprising a longitudinally extending member having a top and a bottom wall and sidewalls, said air box defining an intake aperture and an output aperture, said output aperture positioned in said bottom wall;
a valve assembly in communication with said intake aperture and selectively moveable between an about open position, an about closed position and a plurality of positions therebetween;
a control module that detects a load on the engine and that controls said valve to one of said open positions, said closed position and said positions therebetween based on said detection of said load on said engine; and a filter assembly coupled to said valve assembly.

22. A motorcycle comprising:
a unitary frame member comprising a longitudinally extending member having a top and a bottom wall and sidewalls, the walls together defining an integral air box, said integral air box defining an intake aperture and an output aperture, said output aperture positioned in said bottom wall, and an integral front boss positioned forward of said output aperture and an integral rear boss positioned rearward of said output aperture;
a flexible member disposed in said output aperture and coupled to said air box;
an intake system having an intake member and throttle bodies, the intake member being sealingly engaged to said flexible member; and
a two cylinder V-configured engine, with one cylinder positioned fore and one cylinder positioned aft, in relation to a longitudinal direction of the motorcycle, with said engine held by the unitary frame member and against said intake system, said fore cylinder being attached to said integral front boss and said aft cylinder being attached to said integral rear boss.

23. The motorcycle of claim 22, wherein said unitary frame member is a cast member having an integral head tube, and said integral front and rear bosses for attachment to the engine.

24. The motorcycle of claim 23, wherein the engine is comprised of a first cylinder head having a first top portion and a first side portion; a second cylinder head having a second top portion and a second side portion, said unitary frame member being attached to said first side portion of said first cylinder head and said second side portion of said second cylinder head.

25. The motorcycle of claim 22, wherein said two cylinders of said V-configured engine flank the intake aperture.

26. A motorcycle having an engine, the motorcycle comprising:
an air box integrally formed from a frame member, said frame member comprising a longitudinally extending member having a top and a bottom wall and sidewalls, said air box defining an intake aperture and an output aperture, said output aperture positioned in said bottom wall;
a valve assembly in communication with said intake aperture selectively moveable between an about open position, an about closed position and a plurality of positions therebetween;
a filter assembly coupled to said valve assembly; and
a control module that detects a load on the engine and that controls said valve to one of said open positions, said closed position and said positions therebetween based on said detection of said load on said engine.

* * * * *